(12) United States Patent
Xie et al.

(10) Patent No.: US 7,321,359 B2
(45) Date of Patent: Jan. 22, 2008

(54) METHOD AND DEVICE FOR OPTICAL NAVIGATION

(75) Inventors: Tong Xie, San Jose, CA (US); Marshall T. DePue, San Mateo, CA (US); Douglas M. Baney, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 915 days.

(21) Appl. No.: 10/630,169

(22) Filed: Jul. 30, 2003

(65) Prior Publication Data

US 2005/0024623 A1 Feb. 3, 2005

(51) Int. Cl.
*G09G 5/08* (2006.01)

(52) U.S. Cl. ..................... 345/163; 345/156

(58) Field of Classification Search ........ 345/156–172, 345/175, 176, 179; 356/28, 498, 520, 621
See application file for complete search history.

(56) References Cited

U.S. PATENT DOCUMENTS

| | | | |
|---|---|---|---|
| 3,881,879 A | 5/1975 | Hirabayashi et al. | |
| 4,168,906 A | 9/1979 | Schwiesow | |
| 4,294,544 A | 10/1981 | Altschuler et al. | |
| 4,470,696 A | 9/1984 | Ballard | |
| 4,553,842 A * | 11/1985 | Griffin | 356/621 |
| 4,664,513 A | 5/1987 | Webb et al. | |
| 4,751,380 A | 6/1988 | Victor et al. | |
| 4,794,384 A | 12/1988 | Jackson | |
| 4,857,903 A | 8/1989 | Zalenski | |
| 5,103,106 A * | 4/1992 | Golberstein | 250/559.4 |
| 5,212,535 A | 5/1993 | Miyazaki et al. | |
| 5,229,830 A | 7/1993 | Ishida et al. | |
| 5,260,761 A | 11/1993 | Barker | |
| 5,578,813 A | 11/1996 | Allen et al. | |
| 5,587,785 A | 12/1996 | Kato et al. | |
| 5,589,858 A | 12/1996 | Kadowaki et al. | |
| 5,644,139 A | 7/1997 | Allen et al. | |
| 5,654,736 A * | 8/1997 | Green et al. | 345/105 |
| 5,729,009 A | 3/1998 | Dandliker et al. | |
| 5,786,804 A | 7/1998 | Gordon | |
| 6,069,700 A | 5/2000 | Rudnick et al. | |
| 6,219,143 B1 | 4/2001 | Lindsay et al. | |
| 6,219,145 B1 | 4/2001 | Gutierrez et al. | |
| 6,220,686 B1 | 4/2001 | Ludi et al. | |
| 6,222,174 B1 | 4/2001 | Tullis et al. | |
| 6,246,482 B1 | 6/2001 | Kinrot et al. | |
| 6,256,016 B1 | 7/2001 | Piot et al. | |

(Continued)

FOREIGN PATENT DOCUMENTS

JP 2004151927 5/2004

(Continued)

OTHER PUBLICATIONS

Barkas, W.W., "Analysis of Light Scattered from a Surface of Low Gloss into its Specular and Diffuse Components," Proc. PHys. Soc., vol. 51, (1939), pp. 274-295.

(Continued)

*Primary Examiner*—Nitin I. Patel

(57) ABSTRACT

An method and device suitable for navigation on a wide variety of surfaces is introduced. Specular reflection is used to determine relative motion over typical surfaces. A specific application is a computer mouse.

19 Claims, 9 Drawing Sheets

U.S. PATENT DOCUMENTS

| | | |
|---|---|---|
| 6,268,599 B1 | 7/2001 | Chen et al. |
| 6,281,882 B1 | 8/2001 | Gordon et al. |
| 6,373,047 B1 | 4/2002 | Adan et al. |
| 6,424,407 B1* | 7/2002 | Kinrot et al. ............ 356/28 |
| 6,433,780 B1 | 8/2002 | Gordon et al. |
| 6,442,725 B1 | 8/2002 | Schipke et al. |
| 6,525,306 B1 | 2/2003 | Bohn |
| 6,621,483 B2 | 9/2003 | Wallace et al. |
| 6,642,506 B1 | 11/2003 | Nahum et al. |
| 6,690,474 B1 | 2/2004 | Shirley |
| 6,707,027 B2 | 3/2004 | Liess et al. |
| 6,741,335 B2* | 5/2004 | Kinrot et al. ............ 356/28 |
| 6,747,284 B2 | 6/2004 | Bohn |
| 6,934,037 B2 | 8/2005 | DePue et al. |
| 7,019,733 B2 | 3/2006 | Koay |
| 7,116,427 B2* | 10/2006 | Baney et al. ............ 356/498 |
| 7,161,682 B2* | 1/2007 | Xie et al. ............ 356/520 |
| 7,189,985 B2 | 3/2007 | Xie et al. |
| 2002/0080117 A1 | 6/2002 | Son et al. |
| 2002/0080121 A1 | 6/2002 | Son |
| 2002/0175274 A1 | 11/2002 | Black |
| 2004/0001270 A1* | 1/2004 | Leigh et al. ............ 360/53 |
| 2004/0061502 A1 | 4/2004 | Hasser |
| 2004/0113890 A1 | 6/2004 | Ranta |
| 2004/0227954 A1 | 11/2004 | Xie |
| 2005/0024336 A1* | 2/2005 | Xie et al. ............ 345/166 |
| 2005/0057523 A1 | 3/2005 | Moyer |
| 2005/0073544 A1* | 4/2005 | Scofield et al. ............ 347/16 |
| 2005/0111104 A1 | 5/2005 | Tseng |
| 2005/0156876 A1 | 7/2005 | Kong |
| 2005/0231482 A1 | 10/2005 | Theytaz et al. |
| 2005/0264531 A1 | 12/2005 | Tai et al. |
| 2006/0091298 A1 | 5/2006 | Xie et al. |
| 2006/0187208 A1 | 8/2006 | Wenstrand et al. |
| 2007/0008286 A1 | 1/2007 | Theytaz et al. |
| 2007/0090279 A1 | 4/2007 | Venkatesh |

FOREIGN PATENT DOCUMENTS

| | | |
|---|---|---|
| WO | WO 99/46603 | 9/1999 |
| WO | WO 02/17222 | 2/2002 |
| WO | WO 2004/059613 | 7/2004 |

OTHER PUBLICATIONS

Snadden, Michael J., et al., "Injection-locking technique for heterodyne optical phase locking of a diode laser," Optics Letter, vol. 22, No. 12, (Jun. 15, 1997), pp. 892-894.

Siegman, A.E., "Lasers," Unversity Science Books, 1986, pp. 54-55.

Wyant, J.C., "White Light Extended Source Shearing Interferometer," Applied Optics, vol. 13, No. 1, Jan. 1974, pp. 200-202.

Malacara, D., "Optical Shop Testing," Wiley-Interscience, ISBN 0471522325, 2nd Ed., Jan. 1992, Chapters 1-7.

* cited by examiner

METHOD AND DEVICE FOR OPTICAL NAVIGATION

TECHNICAL FIELD

This application relates to motion sensing devices and more particularly to devices, systems and methods for using specular reflection images to determine relative motion.

BACKGROUND OF THE INVENTION

Optical relative motion detection devices typically utilize image correlation techniques to determine relative motion between the navigation device and a surface by capturing images of the surface as the navigation device passes over the surface or as the surface moves past the navigation device. Both the displacement and the direction of the relative motion of the navigation device with respect to the surface are determined by comparing one image with the following image. Typically, intensity variations due to shadows cast on the surface are detected and the sensitivity and applicability of this technique depend on the intensity contrast in the captured images. Relative motion navigation devices are used, for example, for computer screen pointer (e.g. mouse) control.

U.S. Pat. Nos. 5,786,804, 5,578,813, 5,644,139, 6,442,725, 6,281,882 and 6,433,780 disclose examples of optical mice, other hand-held navigation devices and hand-held scanners. These patents are incorporated herein by reference.

Typical existing optical navigation devices use light emitting diodes (LEDs) to obliquely illuminate the surface to be navigated. Height variations on the surface, on the order of 5 to 500 µm, cast shadows described by geometrical ray optics. The size and contrast of the shadow pattern images depends in part on the type of surface through the size of the height variation. Typically, the detector is positioned to receive the reflection in the surface normal direction and the angle between the surface and the incident light is typically selected to optimize the contrast of the shadow pattern images as is familiar from dark field imaging. Typical values for the angle of incidence are in the range from about 5 degrees to about 20 degrees.

Smooth surfaces such as whiteboard, high gloss paper, plastic or painted metal present functional challenges to typical current optical navigation devices. In general, smooth surfaces are those containing less mid spatial frequency and more high spatial frequency structures. To increase the signal level, high optical power is required for LED illumination resulting in typical current draws in excess of 30 mA.

SUMMARY OF THE INVENTION

In accordance with the invention, a preselected angular distribution of reflected light is captured by the detector of an optical navigation device. Typically, the detector of the optical navigation device is positioned to capture the specular reflection from the surface. The specular reflection creates an image of the surface that differs from both shadow pattern images and speckle patterns. Specular reflection typically provides a better signal compared to the shadow pattern image approach. This allows high contrast images to be obtained even on extremely smooth surfaces. Additionally, image quality is preserved with respect to Lambertian surfaces because light is still scattered into the specular direction. The specular reflection images depend on the wavelength of the illumination source; typically the contrast of the specular reflection images increases as the bandwidth of the illumination source decreases, therefore laser based illumination affords the highest contrast.

In accordance with the invention, power requirements may be reduced by using an illumination source whose wavelength lies at the peak of the detector responsivity curve. The contrast of the specular reflection images depends on the degrees of spatial and temporal coherence of the illumination source. Use of a narrow band illumination source such as a vertical cavity surface emitting laser (VCSEL) or narrow band light emitting diode (LED) provides enhanced image contrast at reduced power. Increasing the bandwidth induces averaging resulting in lower contrast as the returns from individual scatterers illuminated at different wavelengths add incoherently. Therefore, in accordance with the invention, the bandwidth of the illumination source must be narrow enough to have sufficient coherent interference to obtain images of sufficiently high contrast to for reliable optical navigation. For example, an illumination source having a bandwidth on the order of 20 nm provides sufficient contrast for optical navigation on a large range of surfaces in the office desktop environment.

DETAILED DESCRIPTION OF THE INVENTION

If a light beam is incident on a smooth surface, the light rays of the incident beam reflect and remain concentrated in a bundle upon leaving the smooth surface. However, if a surface is microscopically rough, then the light rays reflect and scatter in many different directions. The spatial frequency corresponding to the surface roughness may be on the scale of the illumination wavelength. Each individual ray follows the law of reflection. However, in the case of a rough surface each individual ray meets a portion of the surface that has a different orientation. Therefore, the surface normal is different for different incident light rays. Hence, when the individual rays reflect according to the law of reflection, the individual rays scatter in different directions. Furthermore, when either a coherent or a quasi-coherent illumination is applied, high contrast intensity patterns produced by interference among the reflected and the scatter light may be observed in the specular reflected images. The interference effects provide enhanced contrast to the image for navigation.

Figure 1A:
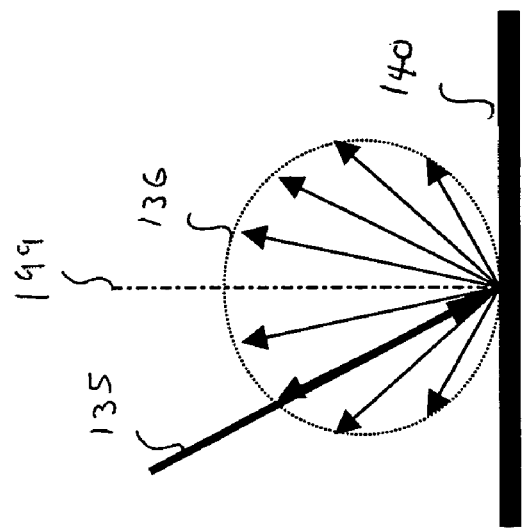
FIGS. 1a-1c illustrate light reflection from different types of surfaces.
Figure 1B:
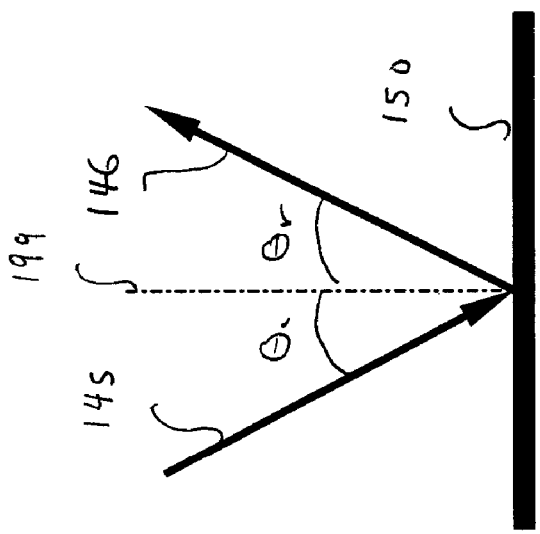
Figure 1C:
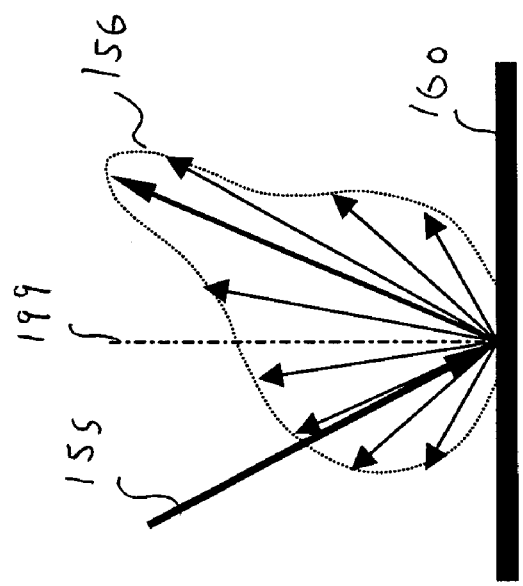

FIGS. 1a-1c illustrate light reflection from different types of surfaces. FIG. 1a shows reflection of light beam 135 from Lambertian surface 140 into beam pattern 136. A Lambertian surface is a perfectly diffusing surface and the intensity of the light emanating in a given direction from any small surface component is proportional to the cosine of the angle of normal 199 to surface 140. FIG. 1b shows reflection of light beam 145 from specular reflector surface 150 into beam 146 which is at an angle $\theta_r=\theta_i$, where the angles are defined with respect to surface normal 199. FIG. 1c shows light beam 155 reflecting from surface 160 into beams 156. Surface 160 is intermediate in surface characteristics between surface 140 and surface 150 and there is a specular component as well as a Lambertian component to beam pattern 156.

It is important to note that specular reflection is not related to optical speckle. The images from specular reflection result from imaging the surface to be navigated over with either coherent or quasi-coherent light. The feature rich images obtained in accordance with the invention vary markedly across different types of surfaces and typically have a one to one correlation with the underlying surface. In contrast, speckle images are highly statistical in nature and to a first approximation are not variable across different types of surfaces. Speckle images exhibit image patterns where the one-to-one correspondence to visible underlying surface features is limited. Although speckle is present anytime objects are illuminated by coherent light, the average size of optical speckle is typically smaller than the pixel size of the imaging array for typical optical navigation applications. When pixel size is appreciably larger than the mean speckle size, speckle is no longer a reliable pattern for optical navigation because the multiple bright and dark speckle features incident on a pixel of the detector array are averaged out over the pixel area. For example, taking an imaging system with an f number of 10 and a laser source operating at 850 nm results in an average speckle size=8.5 μm using the formula: average speckle size=$f \times \lambda$ where $f$ is the f number and $\lambda$ is the wavelength. Here, taking a typical detector array with a pixel size of 60 μm results in more than 49 speckles imaged by each pixel of the detector array. The resulting averaging removes potentially navigable features from the speckle distribution.

Figure 1D:
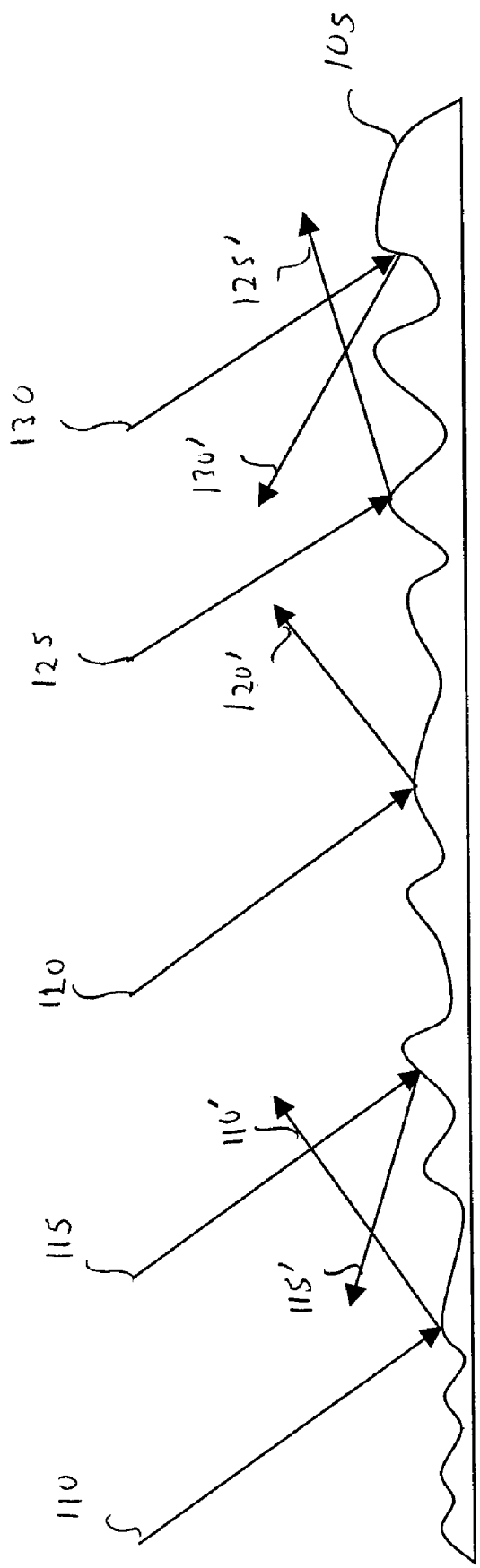
FIG. 1d illustrates the concept of scattering from a surface in accordance with the invention.

FIG. 1d is a simplified illustration of scattering from rough surface 105 in accordance with the invention. Incident light rays 110, 115, 120, 125, 130 of an incident light beam each follow the law of reflection resulting in reflected light rays 110', 115', 120', 125', 130' from rough surface 105 and are scattered upon reflection. Light as referred to herein is intended to include electromagnetic radiation over a wavelength range extending from about 1 nanometer (nm) to about 1 millimeter (mm).

Figure 2:
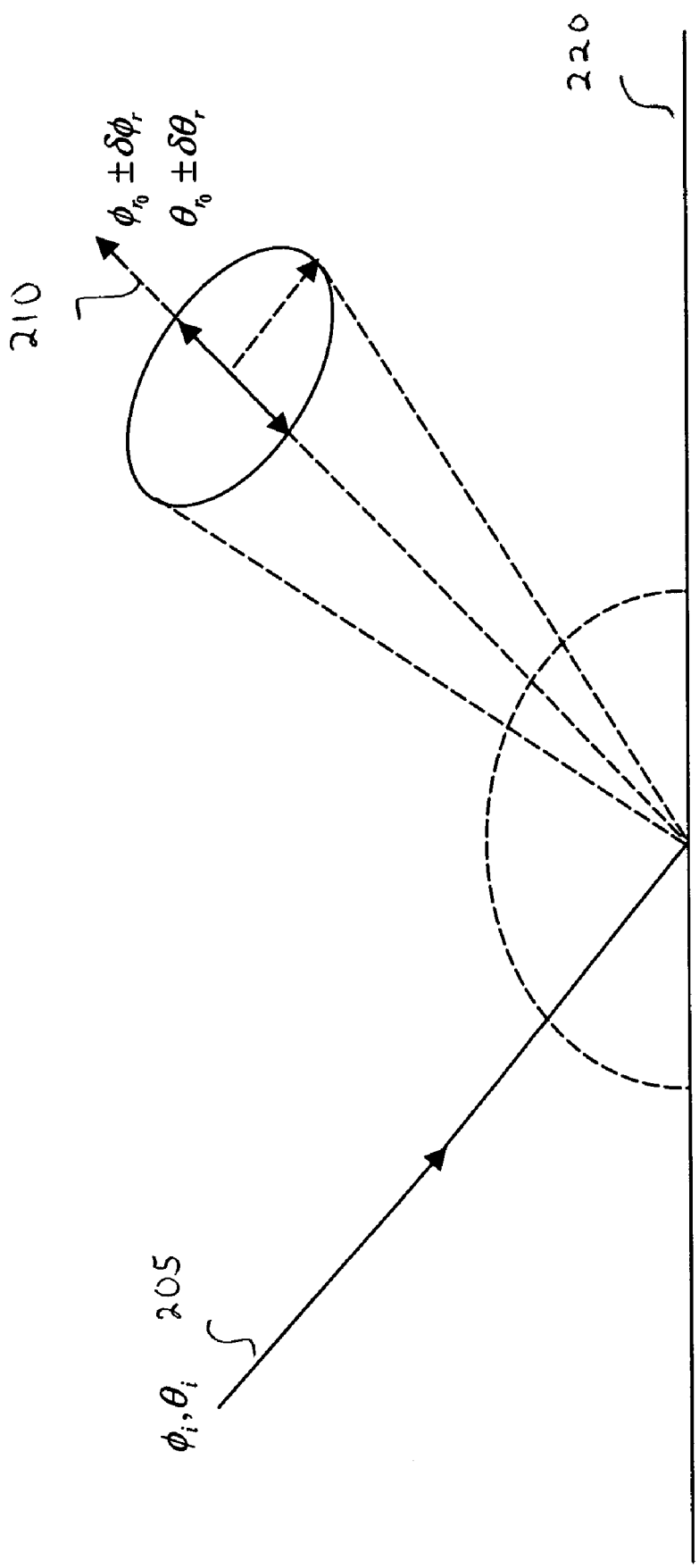
FIG. 2 illustrates specular reflection in accordance with the invention.

FIG. 2 shows a more detailed view of specular reflection from a surface in accordance with the invention. Incident light ray 205 has angular coordinates $\phi_i, \theta_i$ before reflection by surface 220. Typically, surface 220 will have a microscopic roughness or optical irregularity that effects the reflection angle of the reflected light. If reflected light ray 210 lies in the angular cone defined by $\phi_{r_o} \pm \delta\phi_r, \theta_{r_o} \pm \delta\theta_r$, the surface element corresponding to light ray 205 will be captured by the detector.

Figure 3A:
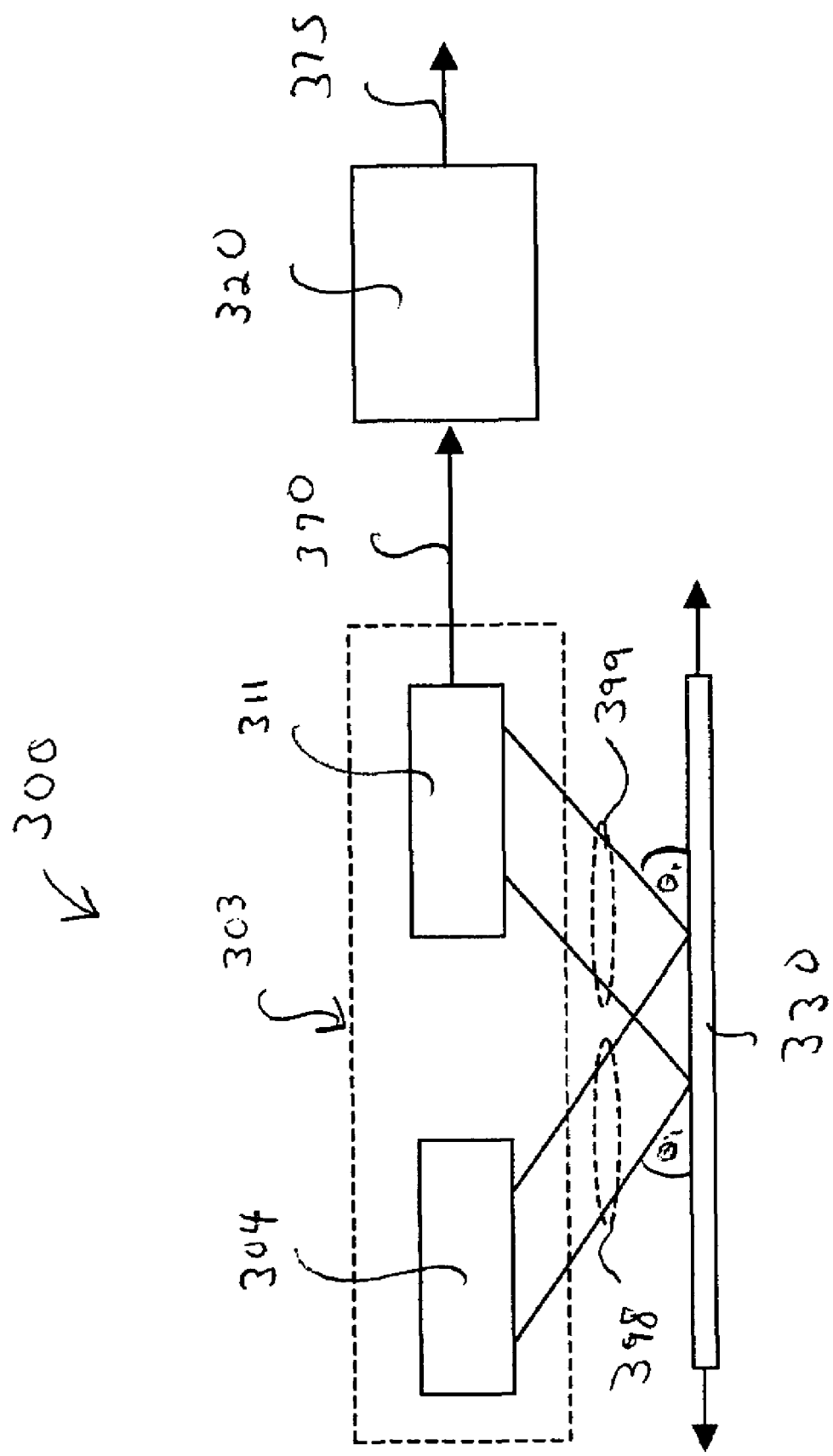
FIG. 3a shows a high level block diagram in accordance with the invention.

FIG. 3a is a high level block diagram in accordance with the invention for optical navigation system 300 based on using specular reflection for navigation. Surface 330 is illuminated by light beam 398 from light source unit 304. Specular reflected light beam 399 is reflected from surface 330 to be detected by detector array unit 311 which generates signal 370 that goes to processor 320. Processor 320 provides output signal 375 in response to signal 370. Output signal 375 may be used, for example, to drive the position of a pointer on a computer screen. Processor 320 may be part of optical navigation device 303 or be located elsewhere in optical navigation system 300. In accordance with the invention, some embodiments of optical navigation device 303 may be an optical mouse for a computer system that is hand moveable.

Figure 3B:
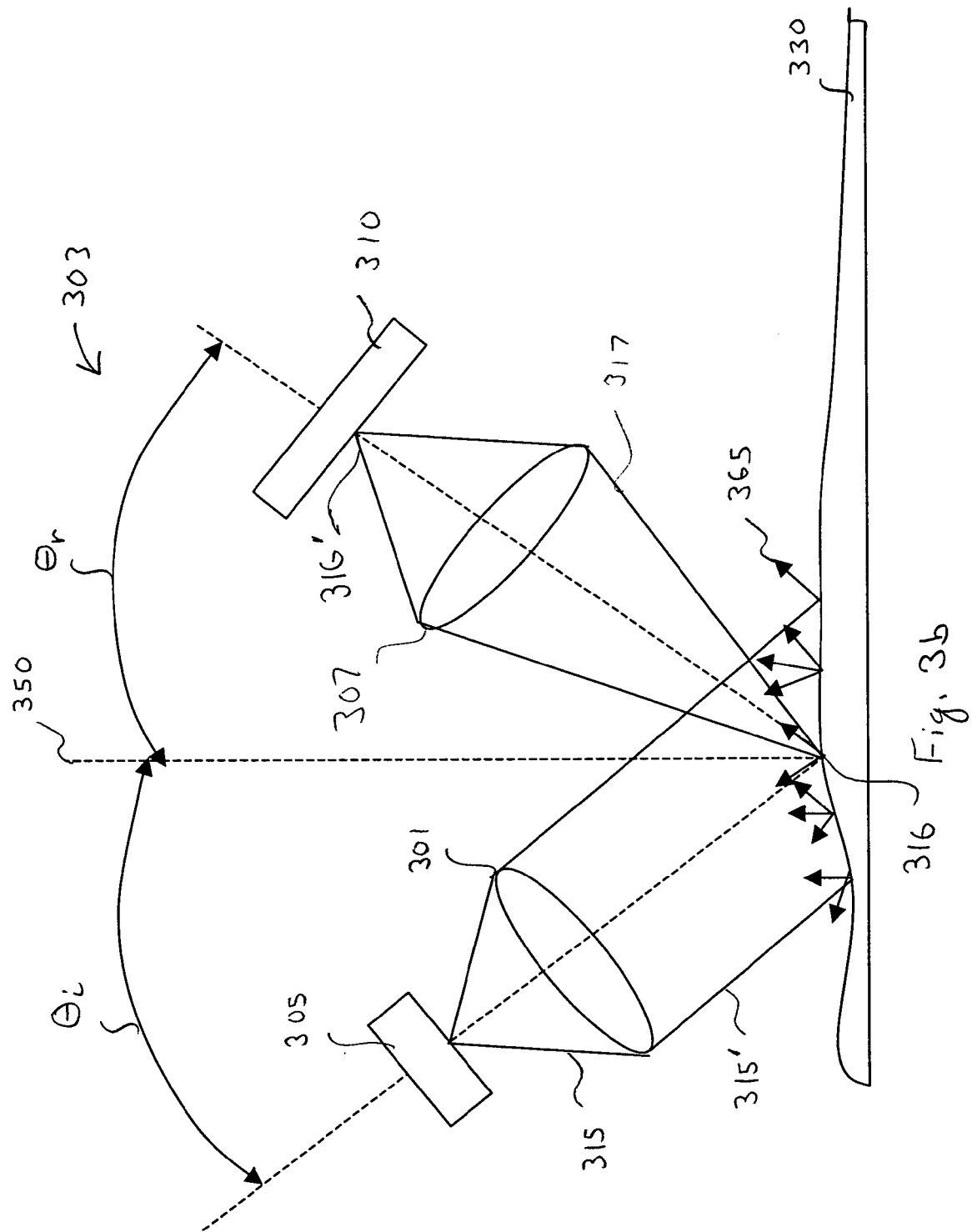
FIG. 3b shows a simplified illustration of optical components of an embodiment in accordance with the invention.

FIG. 3b shows a simplified illustration of components for optical navigation device 303 in accordance with the invention. Light source 305, part of light source unit 304 (see FIG. 3a), is positioned at incident angle $\theta_i$ with respect to surface normal 350 and provides light beam 315 incident on lens 301 to produce beam 315'. Lens 301 primarily functions to improve the collection efficiency for beam 315 and lens 301 is optional. Lens 301 may, for example, be a collimating lens. However, beam 315 need not be collimated if, for example, light source 305 is a laser such as a VCSEL or edge emitter. If light source 305 is quasi coherent source such as a narrow band LED (light emitting diode) or LED with a narrow bandwidth filter then lens 301 or a limiting aperture may be needed for navigation on smooth surfaces. Use of a limiting aperture reduces the power incident on surface 330 but improves spatial coherence. If lens 301 is used, lens 301 may be a diffractive or a refractive lens or other suitable optical element and may be optically coated to improve performance. Instead of using a narrowing aperture together with a conventional narrowband LED, a narrowband edge emitting LED may be used as the light source.

In the context of this patent, a detector is defined to be a device that converts photons to electrical signals. Detector array 310, part of detector array unit 311 (see FIG. 3a) is positioned at reflection angle $\theta_r$ selected such that $\theta_r \approx \theta_i$. Only reflected rays 365 from surface 330 having $\theta_r \approx \theta_i$ make up beam 317 and will be received by detector array 310. The illuminated portion of surface 330 is imaged by lens 307. Point 316 on surface 330 is imaged by lens 307 into point 316' on detector array 310. Hence, the imaging optics allow capture of an image by 310. The image produced by a coherent light source typically includes surface features and interference features. Any speckle present in the image is not important for navigation in accordance with the invention. The interference features arise from coherent addition of individual rays in the specular reflection field. Imaging lens 307 may be a diffractive or refractive lens or other suitable optical element to image portions of surface 330 and may be optically coated with a dielectric thin film to improve performance. Light source 305 typically is a narrow band laser source such as a VCSEL (vertical cavity surface emitting laser) or an edge emitting laser but may be a narrow band LED while detector array 310 is typically a CCD, CMOS, GaAs, amorphous silicon or other suitable detector array. Performance of detector array 310 may be improved by application of anti-reflection dielectric coatings to detector array 310.

Having a higher surface contrast and resolution allows optical navigation device 303 to navigate on smoother surfaces. The effective surface resolution is defined as the smallest resolvable feature on the navigation surface, such as surface 330. The effective surface resolution depends on the modulation transfer function, the magnification of the optics and the effective pixel size of the detector array, such as detector array 310. If magnification is fixed, higher surface resolution requires that, for example, detector array 310 have smaller pixels. The maximum navigation speed over surface 330 for optical navigation device 303 is limited by the maximum frame rate of detector array 310 as well as the processing time for the cross-correlation calculation. The physical displacement of optical navigation device 303 with respect to surface 330 is measured in units of effective pixel size. The effective pixel size is the image size of the pixel on surface 330. This means that if the pixel size of detector array 310 of optical navigation device 303 is reduced, the responsivity or maximum navigation speed of optical navigation device 303 will be reduced. Typically, tradeoffs between the cost of detector array 310, processor 320, total power consumption and desired responsivity are considered and balanced to arrive at the surface resolution and optical magnification for embodiments in accordance with the invention.

As optical navigation device 303 moves relative to surface 330, narrow bandwidth scatter patterns are created at different relative positions between optical navigation device 303 and surface 330. Each scatter pattern is created by the specular reflection from surface 330 that is in the field of view of detector array 310. The narrow bandwidth scatter pattern images depend strongly on the wavelength of light source 305. Typically, the wavelength of light source 305 is selected to be at the peak of detector array 310. Because image contrast and signal are typically improved over the prior art shadow pattern optical navigation systems, shorter image integration times are required which allows higher frame rate acquisition to allow navigation at higher velocities.

By comparing successive stored narrow bandwidth specular reflection images in processor 320, the relative motion of optical navigation device 300 with respect to surface 330 can be determined. Correlation of successive narrow bandwidth scatter pattern images is typically used to determine the displacement of the relative movement. Successive captured scatter pattern images partially overlap with one another. Hence, processor 320 identifies features in each scatter pattern image and calculates the displacement and direction of the relative motion. Storing successive scatter pattern images, overlapping features can be identified by processor 320 using standard image correlation algorithms to provide direction and displacement. Further details may be found, for example, in U.S. Pat. No. 5,786,804 incorporated herein by reference. In accordance with the invention, relative motion even over very smooth but not optically polished surfaces, such as, for example, glass can be determined.

Figure 4:
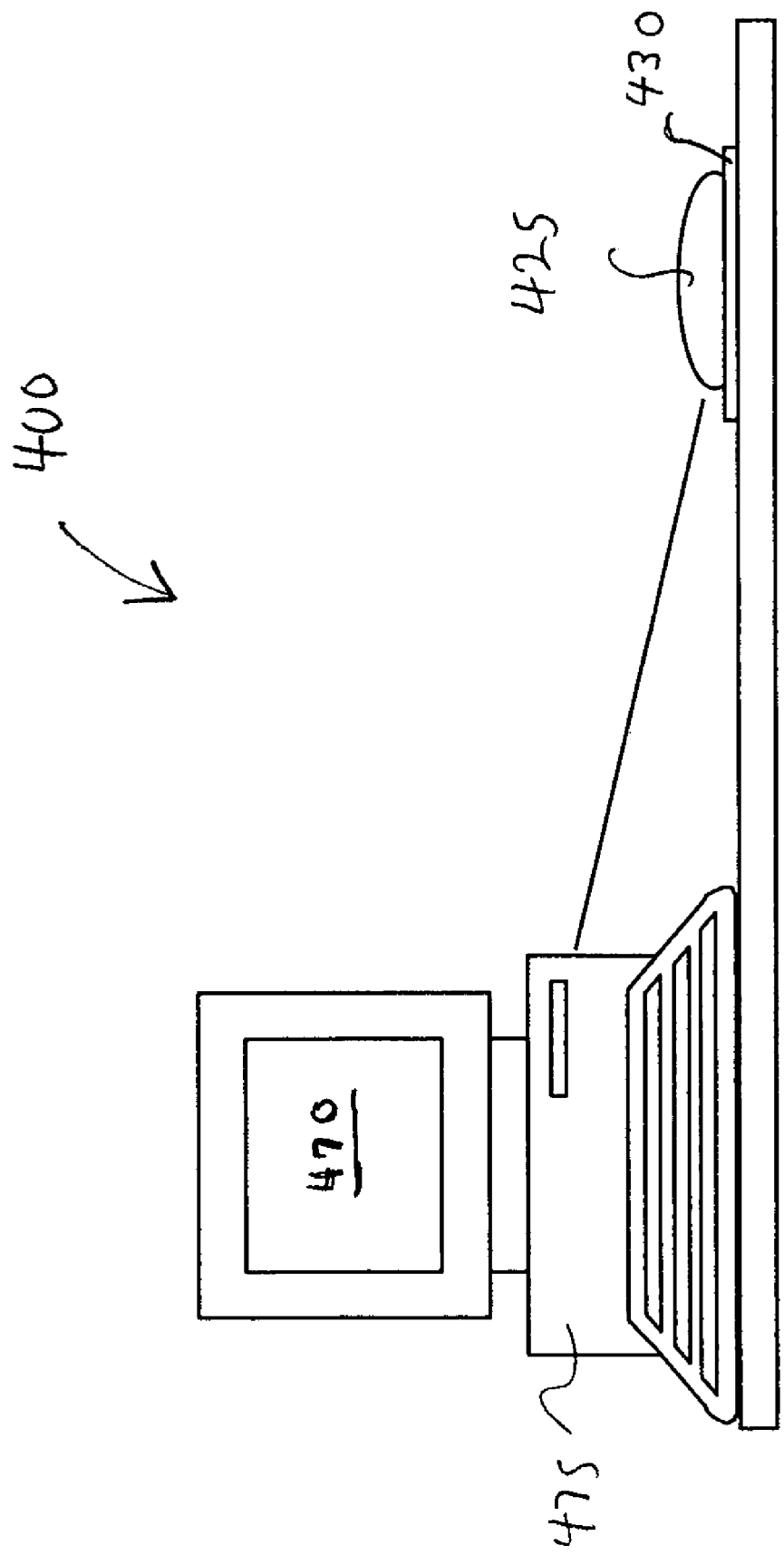
FIG. 4 shows a system in accordance with the invention.

FIG. 4 is a representation of system 400 in accordance with the invention where optical mouse 425 moves over fixed surface 430. Optical mouse typically includes an detector array unit such as detector array unit 311 of FIG. 3a. A series of specular reflection images is typically converted to positional information in optical mouse 425 by processor 320 (see FIG. 3) and sent by wire or sent wirelessly to central processor unit 475 for display on video screen 470 as a positional pointer such as an arrow. Alternatively, raw or intermediate data may be sent from detector array unit 311 (see FIG. 3a) to central processor unit 475 for processing. Wireless connections may be either radio frequency or infrared and wireless embodiments of optical mouse 425 in accordance with the invention may be powered by, for example, a rechargeable battery, fuel cell or solar cells.

Figure 5:
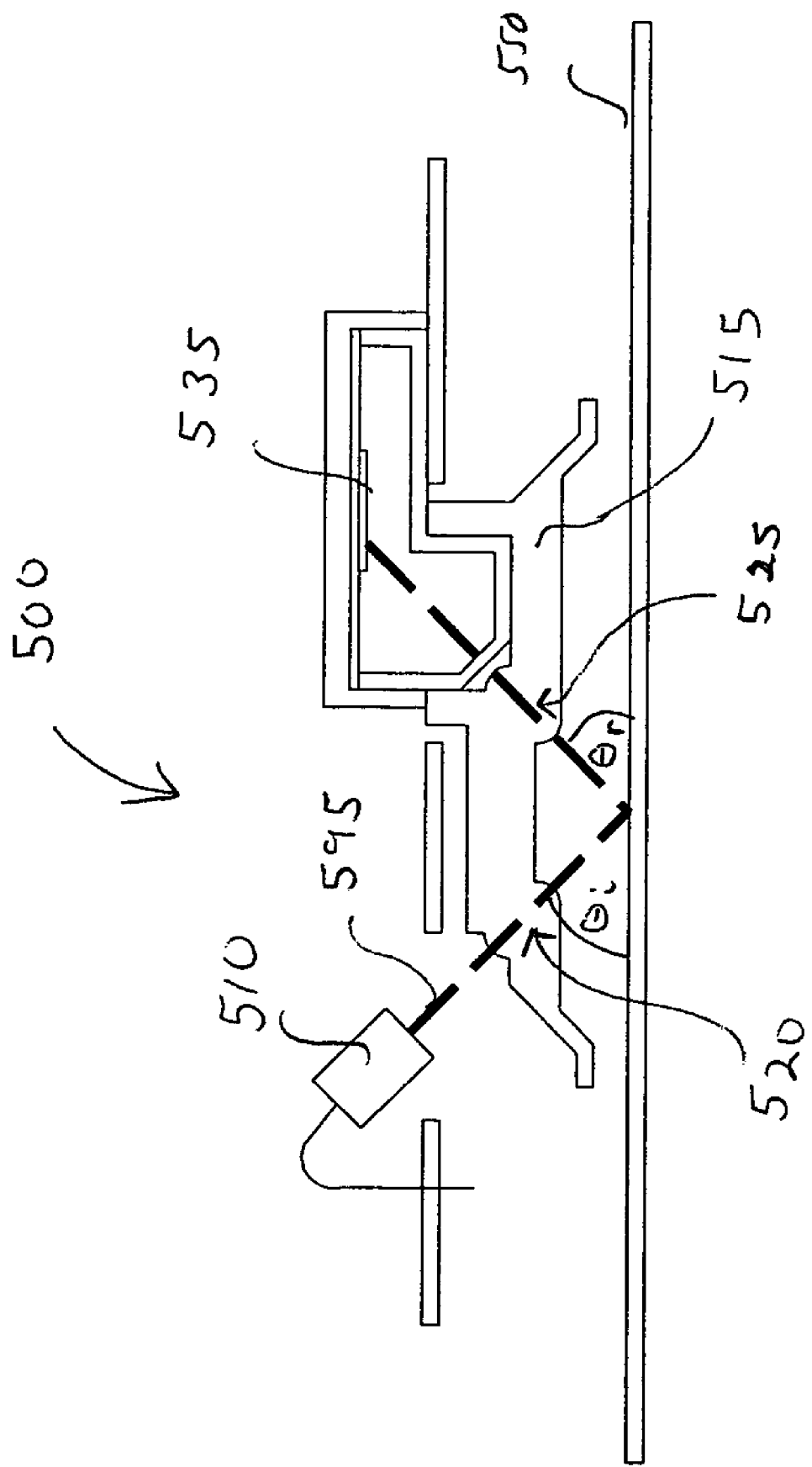
FIG. 5 shows an embodiment in accordance with the invention.

FIG. 5 shows an embodiment of optical navigation device 500 in accordance with the invention. Packaged VCSEL and sensor die 510 is discrete and functions as the light source with collimating lens 520 and imaging lens 525 integrated and formed in molded plastic structure 515. Sensor die 535 incorporates an detector array such as detector array 310 discussed above. The integration of collimating lens 520 and imaging lens 525 into molded plastic structure simplifies manufacturing and reduces cost. The detector array in sensor die 535 is positioned to receive light at the angle of reflection $\theta_r$ which is equal to the angle of incidence $\theta_i$ for beam 595, thereby assuring that the resulting signal from the detector array represents the specular reflection. Sensor die 535 may be oriented so that beam 595 is incident normal to the plane of the detector array.

Figure 6:
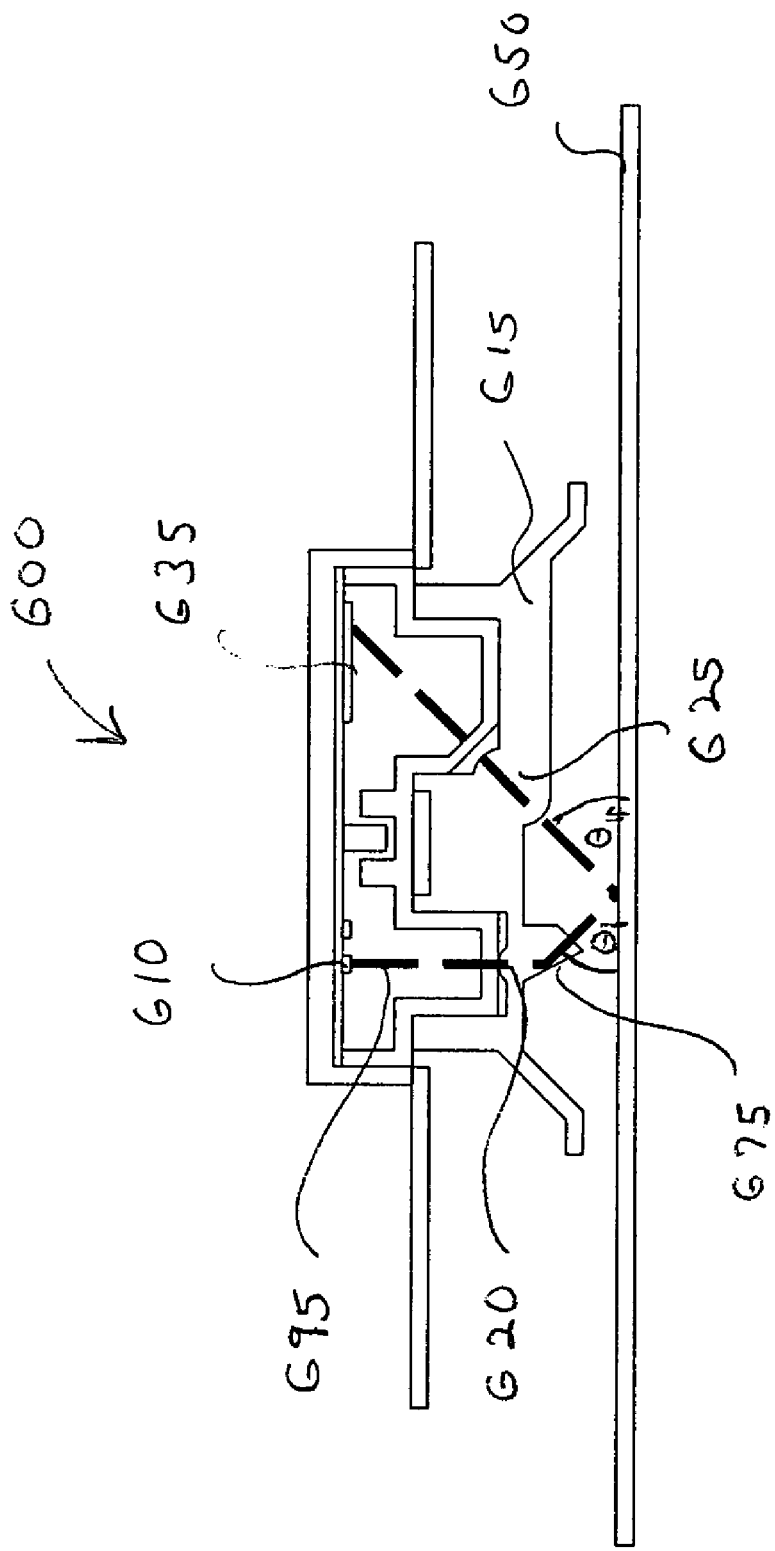
FIG. 6 shows an embodiment in accordance with the invention.

FIG. 6 shows an embodiment of optical navigation device 600 in accordance with the invention. Integrated VCSEL 610 die functions as the light source with collimating lens 620 and imaging lens 625 integrated and formed in molded plastic structure 615. Sensor die 635 incorporates an detector array such as detector array 310 discussed above. The integration of collimating lens 620 and imaging lens 625 into molded plastic structure simplifies manufacturing and reduces cost. Beam 695 travels vertically through collimating lens 620 and is reflected by total internal reflection face 675 to be incident on surface 650 at an angle of incidence $\theta_i$. The detector array in sensor die 635 is positioned to receive light at the angle of reflection $\theta_r$ which is equal to the angle of incidence $\theta_i$ for beam 695, thereby assuring that the resulting signal from the detector array represents the specular reflection. Sensor die 635 may be oriented so that beam 695 is incident normal to the plane of the detector array.

Figure 7:
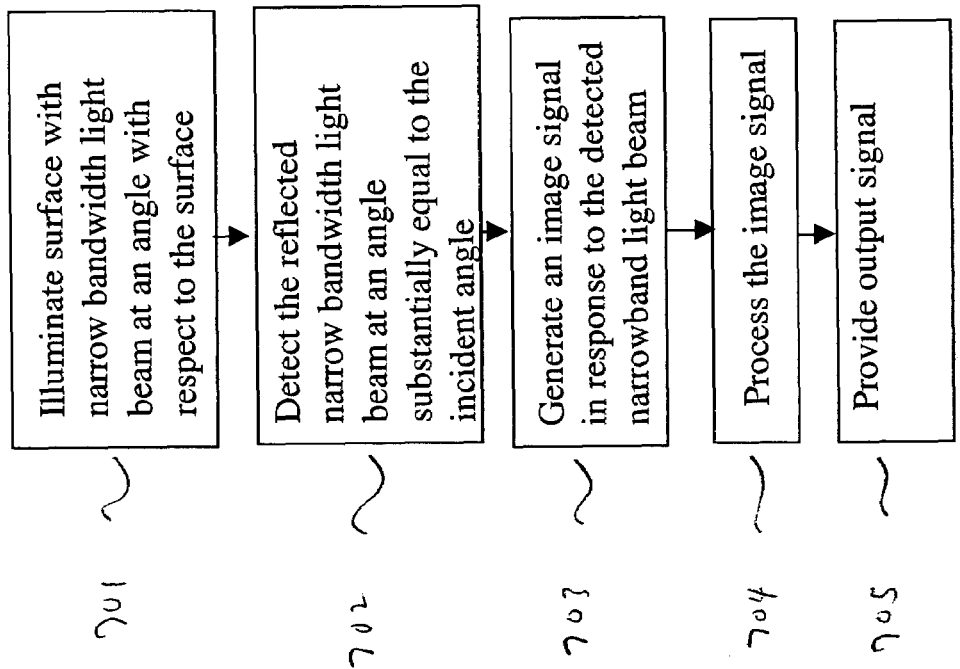
FIG. 7 shows a flow diagram depicting steps involved in a method in accordance with the invention.

FIG. 7 is a flow diagram showing the steps involved in a method of using optical navigation system 303 in accordance with the invention. In step 701, surface 303 is illuminated by narrow bandwidth light beam 398 at an angle of incidence, $\theta_i$. In step 702, detector array 311 detects reflected narrow bandwidth light beam 399 at an angle of reflection $\theta_r$ close to or equal to the angle of incidence $\theta_i$. In step 703, an image signal is generated by detector array 311 in response to narrow bandwidth light beam 399. In step 704, the image signal is processed by processor 320. In step 705, output signal 375 is provided in response to image signal 370 and may be used, for example, to control a positional pointer on video screen 470.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. An optical navigation device comprising:
   a light source for illuminating a surface with a narrow bandwidth beam at an angle of illumination with respect to said surface;
   a detector positioned at an angle of reflection with respect to said surface operable to receive a reflected portion of said narrow bandwidth beam, wherein said angle of reflection is substantially equal to said angle of illumination; and
   a filter positioned between said light source and said surface.

2. The device of claim 1 wherein said light source is a laser.

3. The device of claim 2 wherein said laser is a VCSEL.

4. The device of claim 1 wherein said light source is a narrow bandwidth LED.

5. The device of claim 4 wherein said narrow bandwidth LED is an edge emitting LED.

6. The device of claim 1 further comprising a limiting aperture disposed between said light source and said surface.

7. The device of claim 1 wherein said detector array is a CMOS imager.

8. The device of claim 1 further comprising a collimation lens to improve the light collection efficiency.

9. The device of claim 1 further comprising an imaging lens positioned to be operable to image said reflected portion of said narrow bandwidth beam onto said detector array.

10. A system for controlling a positional pointer on a video screen of a computer using a mouse to detect relative motion with respect to a surface, said system comprising:
 means for generating narrow bandwidth specular reflection images, each said narrow bandwidth scatter pattern being specific to a portion of said surface over which said mouse moves;
 a filter located between said means for generating and said surface; and
 means for converting said specific narrow bandwidth specular reflection images into signals corresponding to relative motion between said mouse and said surface.

11. The system of claim 10 wherein said generating means comprises a narrow bandwidth light source.

12. The system of claim 10 wherein said means for converting comprises a processor located within said mouse.

13. The system of claim 10 wherein said surface is chosen from paperlike surface, glossy type surface, painted surface and halftone surface.

14. The system of claim 10 wherein said narrow bandwidth specular reflection images comprise surface features and interference features.

15. A method for determining relative motion between an optical navigation device and a surface, said method comprising:
 providing a narrow bandwidth light beam at an angle of illumination with respect to said surface for illuminating said surface;
 providing a filter positioned between in said light beam; and
 receiving a reflected portion of said narrow bandwidth light beam at an angle of reflection with respect to said surface, such that said angle of reflection is substantially equal to said angle of illumination.

16. The method of claim 15 wherein said narrow bandwidth light beam is provided by a laser.

17. The method of claim 15 wherein said reflected portion of said narrow bandwidth light beam is received by a detector array.

18. The method of claim 15 further comprising generating an image signal in response to said reflected portion of said narrow bandwidth light beam.

19. The method of claim 18 further comprising a processor to receive said image signal and produce an output signal for controlling a positional pointer.

\* \* \* \* \*